(12) United States Patent
Huang

(10) Patent No.: US 6,188,520 B1
(45) Date of Patent: Feb. 13, 2001

(54) LIGHT POLARIZATION CONVERTER

(75) Inventor: Austin Lancelot Huang, Camas, WA (US)

(73) Assignee: Sharp Laboratories of America, Inc., Camas, WA (US)

( * ) Notice: Under 35 U.S.C. 154(b), the term of this patent shall be extended for 0 days.

(21) Appl. No.: 09/430,376

(22) Filed: Oct. 29, 1999

(51) Int. Cl.$^7$ .......................... G02B 27/14; G02B 27/12
(52) U.S. Cl. .......................... 359/629; 359/636; 359/639
(58) Field of Search .......................... 359/618, 220, 359/221, 245, 246, 634, 636, 639, 629, 726, 728

(56) References Cited

U.S. PATENT DOCUMENTS

| | | | |
|---|---|---|---|
| 5,122,895 | 6/1992 | Takanashi et al. | 359/247 |
| 5,164,854 | 11/1992 | Takanashi et al. | 359/256 |
| 5,493,624 | 2/1996 | Thompson | 385/11 |
| 5,684,630 | 11/1997 | Arai | 359/487 |
| 5,883,746 | 3/1999 | Zelenka | 359/629 |
| 5,900,985 | 5/1999 | Ho et al. | 359/640 |
| 5,903,388 * | 5/1999 | Sedlmayr | 359/497 |
| 6,122,028 * | 4/2000 | Gilmour et al. | 349/117 |

* cited by examiner

Primary Examiner—Georgia Epps
Assistant Examiner—Saeed Seyrafi
(74) Attorney, Agent, or Firm—Marger Johnson & McCollom, P.C.

(57) ABSTRACT

A polarizer is made from pairs of polarizing beam splitting cubes. In every pair, a first cube transmits P-polarized light and reflects S-polarized light. A retarder rotates the transmitted light to become S-polarized. A second cube receives only the reflected light, and redirects it in the direction of the transmitted light. A polarizing filter filters the reflected light, but not the rotated light. Exposing the retarder improves the transmission throughput of the overall polarizer. A stop at the side of the second cube blocks light from entering the first cube of an adjacent pair.

7 Claims, 5 Drawing Sheets

US 6,188,520 B1

LIGHT POLARIZATION CONVERTER

BACKGROUND OF THE INVENTION

1. Field of the Invention

The present invention is related to the field of light polarization converters, and more specifically to an improved polarization converter that uses beam splitting cubes.

2. Description of the Related Art

Naturally occurring light is not polarized, which is a state also known as unpolarized. Polarized light is desirable for various applications. Polarized light is derived from unpolarized light using a polarizer, as explained below.

Referring now to FIG. 1, a beam 22 of unpolarized light is incident upon polarizer 24, which operates on the light. At least one beam 26 of polarized light exits polarizer 24. The incident beam travels along a propagation direction 28, and the exiting beam travels along a propagation direction 30. In many applications, direction 30 is the same as direction 28.

Referring now to FIG. 2, the polarization of beam 22 is explained in more detail. A point 40 is considered along direction 28. What the human eye perceives as light is really traveling electric field vectors 44, 46. Although only two such vectors are shown, in fact there can be many. For unpolarized light, their points are distributed uniformly around circle 48.

It is conventional to analyze the electric field in terms of its components along two orthogonal axes 52, 54, that are perpendicular to propagation direction 28. It should be noted that the axes 52, 54 can be translated along any point of direction 28, such as point 40. This analysis is useful for discussing polarizers. The directions of axes 52, 54, are also known as S and P directions.

It can be seen, therefore, how a single vector 46 relates to the two axes 52, 54. Each vector would have a component on axis 52, and a component on axis 54. In fact, all vectors with points on circle 48 can be similarly decomposed into components on the axes 52, 54. When they are all so decomposed, all the vectors for light beam 22 are added along each axis. This results in two vectors 72, 74, that represent the whole beam 22, for polarization purposes. Due to the symmetry of circle 48, the two vectors 72, 74 are equal in intensity for unpolarized light.

Referring now to FIG. 3, the action of polarizer 24 of FIG. 1 can be better appreciated. A light at a point 80 of beam 26 is considered. The point 80 is movable along direction 30. The beam 26 is made from light that has an electric field vector 82 only along axis 52. There is no component along axis 54. This is called perfectly linear polarized light, and is polarized in the direction of axis 52. While it appears the same to the human eye as unpolarized light, it has very useful properties, which makes polarizers desirable.

As such, a polarizer is a device or an arrangement that receives randomly polarized light, and permits to exit only linearly polarized light. Moreover, a polarization converter is a term in the art for a device that either rotates the polarization of received light, or converts randomly polarized light into linearly polarized light. In other words, the term polarization converter has come to be used also for a polarizer.

A useful prior polarizer is now described referring to FIG. 4. A polarizing beam splitting (PBS) cube 110 is transparent, and has a hypotenuse surface 112. The cube 110 receives an incident beam of light 116, traveling along an incident direction 117. The cube 110 partially transmits a beam of light 118 along a transmission direction, which is typically identical to the incident direction 117. The PBS cube 110 also partially reflects a beam of light 120 along a reflected direction 122. Preferably the hypotenuse surface 112 is located at a 45° angle from the incident direction 117, in which case reflected direction 122 is at right angles from the incident direction 117.

The incident beam of light 116 is regarded as unpolarized, although that is not necessary. Specifically, one of its electric field vectors $I_P$ is in the same plane as the drawing. Vector $I_P$ is shown as an arrow, and corresponds to the P direction. The other electric field vector $I_S$ is perpendicular to the plane of the drawing, and thus also perpendicular to the paper. Vector $I_S$ is a shown as a circled dot, and corresponds to the S direction.

The transmitted beam of light 118, that exits undeflected from the hypotenuse surface 112 of the cube 110, has a transmission component $T_P$ in the P direction, and a transmission component $T_S$ in the S direction. Similarly, the beam of light 120 that is reflected by the hypotenuse surface 112 has a reflection component $R_P$ in the P direction, and a reflection component $R_S$ in the S direction.

The polarizing beam splitting cube 110 has a very useful property, which is why it is used for making polarizers. Theoretically, it splits the incident beam 116 into a P-polarized transmitted beam, and an S-polarized reflected beam. As such, the polarizing beam splitting cube 110 theoretically separates the incident light into two beams of equal intensity, each polarized only in its own direction.

In practice, the actual polarizing beam splitting cube 110 typically deviates from the above described theoretical performance, but not much. The transmission component $T_S$ is small. For example, if the illuminating beam is a f/2.5 white light, then $T_S=0.005 \times I_S$. As such, the transmitted beam 118 is light very highly polarized along that the P direction, with a small component in the S direction. Furthermore, the reflection component $R_P$ is relatively small, too. For example, for the same kind of illuminating light, $R_P=0.08 \times I_P$. As such, the reflected beam 120 is light mostly polarized along the S direction, with the diminished component in the P direction. In each case there is a dominant polarization component as prescribed by theory, but also a minor polarization component.

There are two criteria for gauging the performance of a polarizer. One criterion is how well the undesirable component has been extinguished. The other criterion is how much light intensity of the desirable polarization component is permitted to go through. Like all other real life optical devices, the PBS cube 110 introduces losses, too. For the same kind of illuminating light, $T_P=0.92 \times I_P$ (a loss of 8%), and $R_S=0.995 \times I_S$ (a small loss of 0.5%). A problem with using a PBS cube is that all the light of beam 120 is wasted.

A polarizer 140 in the prior art is now described with reference to FIG. 5. The components of the polarizer 140 are shown separated from each other, i.e. not contacting each other, but that is only for purposes of illustration. It will be appreciated that the inclusion of the secondary cubes rescues a lot of the light that would have been otherwise wasted as beam 120 of FIG. 4.

The polarizer 140 is made from stack of PBS cubes, with their hypotenuse surfaces parallel. Only six cubes 142, 143, 144, 145, 146, 147 are shown. The front surfaces of odd-numbered PBS cubes 143, 145, 147, are respectively obstructed by opaque shields 153, 155, 157. The even numbered PBS cubes 142, 144, 146 have at their rear faces half-wave retarders 162, 164, 166 respectively. The whole stack has a polarizing filter 170 at the exit, to ensure that the undesirable polarization component has been extinguished.

Incident light 176 impinges upon the polarizer 140 along a direction 177, which is shown as many parallel lines. A transmitted beam 178 emerges after the polarizing filter 170, polarized in the desirable direction. A reflected beam 180, polarized substantially only in the undesirable direction, emerges from the side along a side direction 182 and is discarded.

It should be noted that the emerging beam 178 emerges from the entire face of polarizing filter 170. That is notwithstanding the fact that, due to the opaque shields, the incident light enters the polarizer 140 from the front faces of only half of the PBS cubes, namely only from PBS cubes 142, 144, 146. The operation of polarizer 140 is now described with reference to FIG. 6.

Referring now to FIG. 6, the operation of a pair of PBS cubes 144, 145 of the polarizer 140 of FIG. 5 is described. It will be appreciated that the polarizer 140 operates as an aggregation of many such pairs.

The incident beam 176 impinges only upon cube 144 along incident direction 177. Any portion of the incident beam 176 that would ordinarily impinge upon cube 145 is blocked by the opaque shield 155.

Cube 144 acts as a separator of the two beams, each with its own polarization, as described above in connection with FIG. 4. However, a novel convention is employed in FIGS. 6 and 7 of this document, to denote which one is the dominant component, and which one is the minor component, which arises due to the fact that PBS cube 145 does not behave ideally. The novel convention is that, while the dominant component is drawn on the line representing the direction of travel of light, the minor component is drawn outside that line, but still close to the dominant component.

Cube 144 transmits a portion of the light along the incident direction 177, which emerges as beam 188. Right after cube 144, beam 188 has a dominant polarization component 192 in the P direction, and a minor polarization component 194 in the S direction. The half wave retarder 164 rotates these polarization components. As such, reaching the polarizing filter 170 is a dominant polarization component 202 in the S direction (rotated from 192), and a minor polarization component 204 in the P direction (rotated from 194).

The polarizing filter 170 permits only light with polarization similar to that of polarization component 202 to go through. As such, beam 188 is made only by component 212, polarized in the S direction. The polarizing filter 170 thus extinguishes component 204, leaving only highly polarized light.

A PBS cube 144 also reflects a portion of the light along reflected direction 182. That light includes a dominant polarization component 222 in the S direction, and a minor polarization component 224 in the P direction. The reflected light is reflected again on the hypotenuse surface of cube 145, thus traveling along a new direction 226. The new direction 226 is typically made parallel to the incident direction 177. This is easily accomplished if the cubes are identical.

Light traveling along new direction 226 has a dominant polarization component 232 in the S direction (from component 222), and a minor polarization component 234 in the P direction (from component 224). Similarly as above, a beam 238 emerges after filter 170. The filter has extinguished component 234, and thus the beam 238 includes only a component 242 (from 232).

The polarizing filter 170 introduces a lot of losses, but is regarded in the prior art as necessary. The PBS cube 145 does not reflect all the light it receives. Some goes through it as beam 250. Similarly, a PBS cube 144 receives a beam 260. As they travel along direction 182, the beams 250 and 260 reach the subsequent hypotenuse surfaces, and reflect some light in the direction of the transmitted beams. The polarizing filter 170 attenuates that portion of the light that is in the undesirable polarization.

BRIEF SUMMARY OF THE INVENTION

The present invention overcomes these problems and limitations of the prior art.

Generally, the present invention provides a polarizer made from a first polarizing beam splitting cube that transmits light in a first polarization, and reflects light in a second polarization. A retarder rotates the transmitted light to be in the second polarization. Further, a reflector such as a second polarizing beam splitting cube redirects the reflected light in the direction of the transmitted light. A polarizing filter filters the reflected light, but not the rotated light. Exposing the retarder improves the transmission throughput of the overall polarizer of the invention.

In another embodiment, the polarizer is made from pairs of polarizing beam splitting cubes. An optional attenuator between the pairs prevents reflected light from one pair from entering the first polarizing beam splitting cube of the second pair and being reflected from the hypotenuse surface and the transmitted direction.

The foregoing and other objects, features and advantages of the invention will become more readily apparent from the following detailed description of a preferred embodiment, which proceeds with reference to the drawings.

DETAILED DESCRIPTION OF THE PREFERRED EMBODIMENT(S)

As has been mentioned, the present invention provides an improved light polarizer. Various embodiments are now described in detail. The components are shown unattached, to facilitate explanation. In the actual implementations, they are preferably attached.

Figure 7:
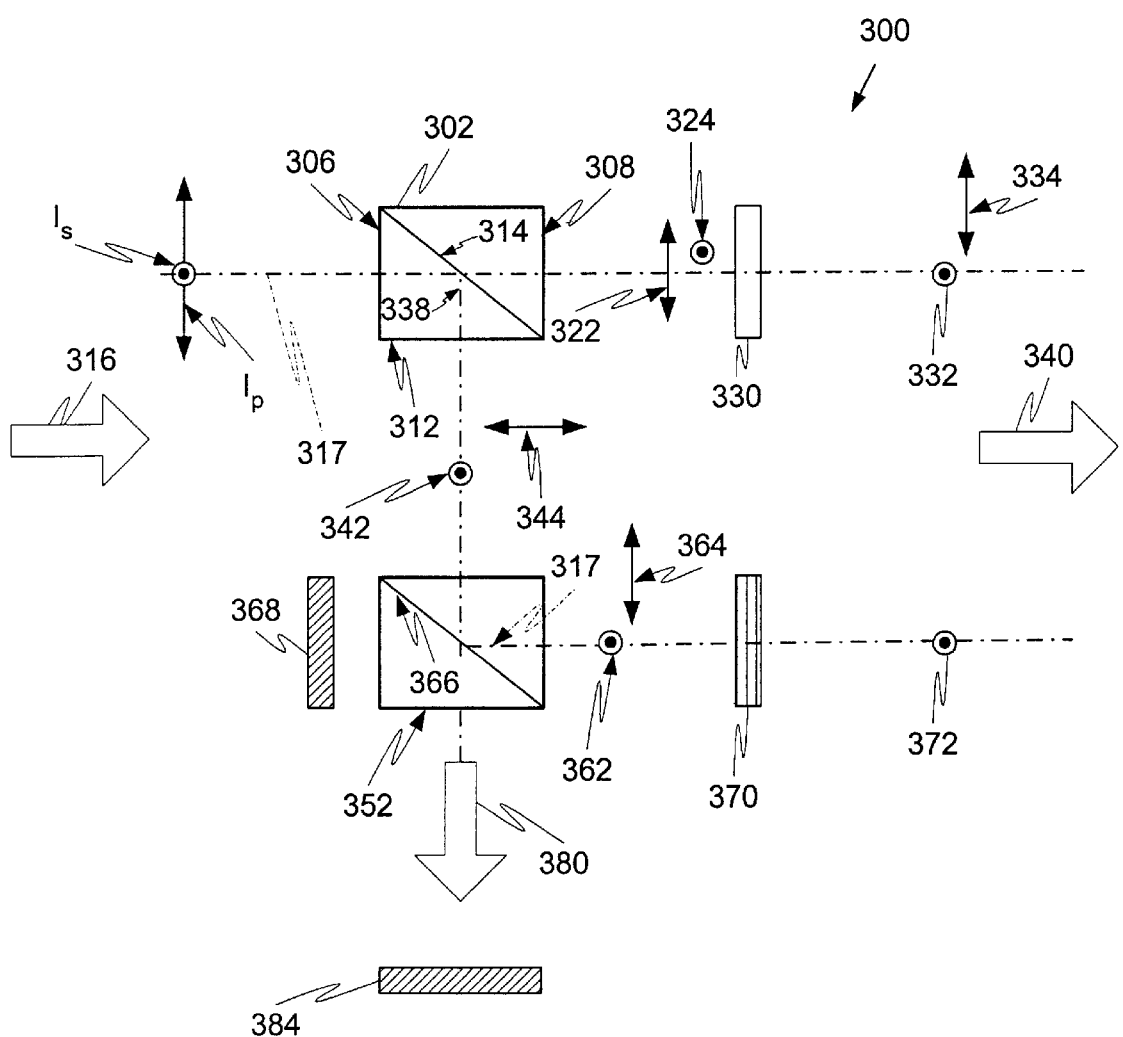
FIG. 7 is a diagram of a polarizer made according to a first embodiment of the present invention.

Referring now to FIG. 7, a polarizer 300 made according to the first embodiment of the present invention is described. The polarizer 300 includes a first polarizing beam splitting (PBS) cube 302. The PBS cube 302 has a front surface 306 and a rear surface 308, which are typically parallel to each other. The cube 302 also has at least one side the surface 312. Importantly, the cube 302 has a hypotenuse surface 314 between the front surface 306 and the rear surface 308.

The cube 302 receives an incoming beam of incident light 316 along an incident direction 317. When beam 316 reaches the hypotenuse surface 314, a portion of it continues along a transmission direction, which is generally the same as incident direction 317. At that time, the transmitted beam has a dominant polarization component 322 in the P direction, and a minor polarization component 324 in S direction.

The polarizer 300 further includes a retarder 330. The retarder 330 in general rotates the polarization of the beam that exits the rear surface of the cube 302. It is preferred, but not necessary, that the retarder introduces a 90° difference. In other words, the electric field vectors, or polarization components, are rotated by 90°. As such, there exits from the retarder 330 light having a dominant polarization 332 in the S direction (from component 322), and a minor polarization 334 in the P direction (from component 324). The light exiting the retarder 330 becomes a component of an output beam 340 of the polarizer 300.

Another portion of beam 316 is reflected by hypotenuse surface 314 in reflected direction 338. The reflected portion exits through the side surface 312. The reflected portion includes a dominant component 342 polarized in the S direction, and a minor component 344 polarized in the P direction.

The polarizer 300 further includes a reflector 352. The reflector 352 reflects the light exiting through the side surface of the first PBS cube 302 along the reflection direction 338. Preferably the reflector 352 reflects that light in the transmission direction, which in this case is also the incident direction 317, so that the light joins the beam 340. The exiting light has a dominant component 362 polarized in the S direction (from component 342), and a minor component 364 polarized in the P direction (from component 344).

The preferred way for making a reflector 352 is by employing a second polarizing beam splitting cube 352. Reflection takes place at a hypotenuse surface 366 of the second PBS cube 352. In that case, it is highly preferable to include an opaque shield 368 in the front side of cube 352, so as to prevent the incoming light beam 316 from entering the cube 352 along the incident direction 317.

The polarizer 300 further includes a polarizing filter 370. The polarizing filter 370 filters at least a portion of the light reflected by the reflector 352. As such, there exits from the polarizing filter light with only a component 372 polarized in the S direction. This is preferably accomplished by making the filter 370 of the appropriate size and shape so as to cover the rear surface of the second PBS cube 352.

Importantly, the polarizing filter 370 does not filter at least a portion of the light exiting the retarder 330. This is preferably accomplished by making the filter 370 of the appropriate size and shape so as not to cover the rear surface of the first PBS cube 302.

The polarizer 300 of FIG. 7 thus is made by the pair of polarizing beam splitting cubes. The cubes can contact each other, which automatically aligns the surfaces. Accordingly, hypotenuse surface 314 ends up being parallel to the hypotenuse surface 366. The cubes of every pair can be called first and second cube, main and auxiliary cube, etc.

Figure 1:
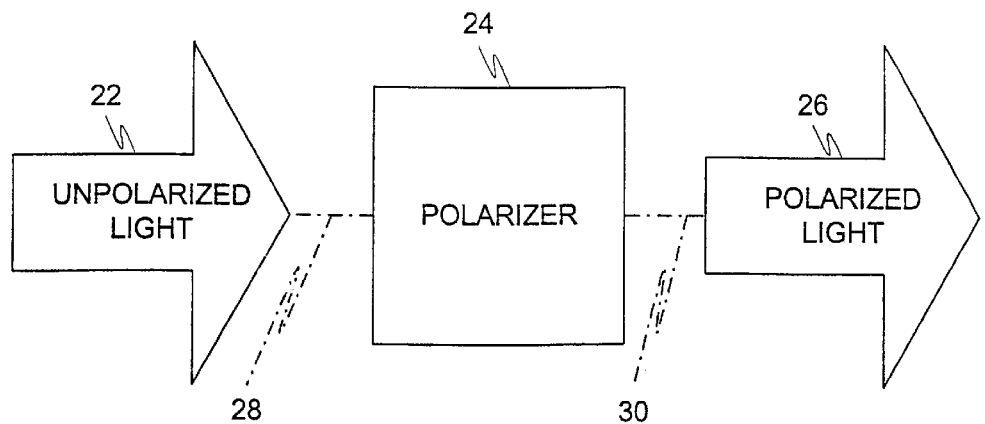
FIG. 1 is a block diagram for explaining the function of a polarizer.
Figure 2:
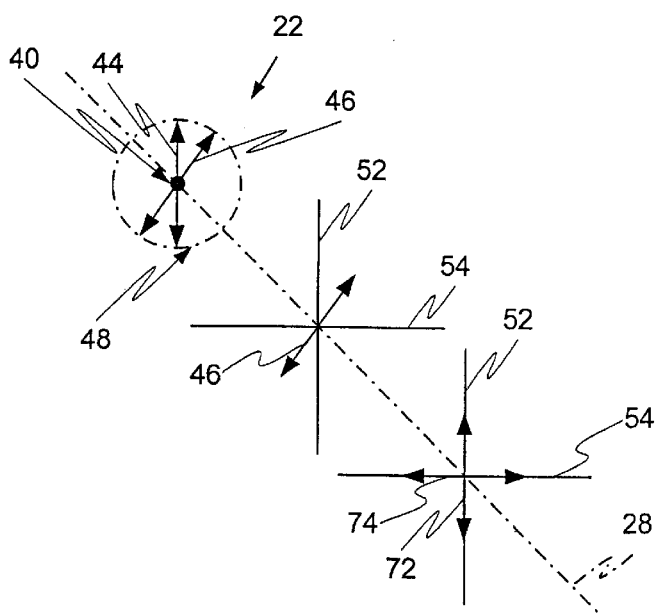
FIG. 2 is a polarization diagram for an unpolarized light beam of FIG. 1.
Figure 3:
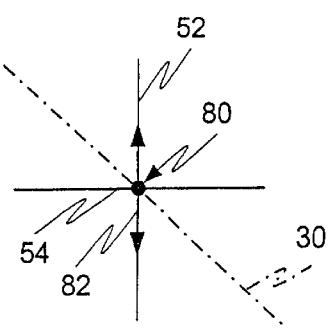
FIG. 3 is a polarization diagram for a polarized light beam of FIG. 1.
Figure 4:
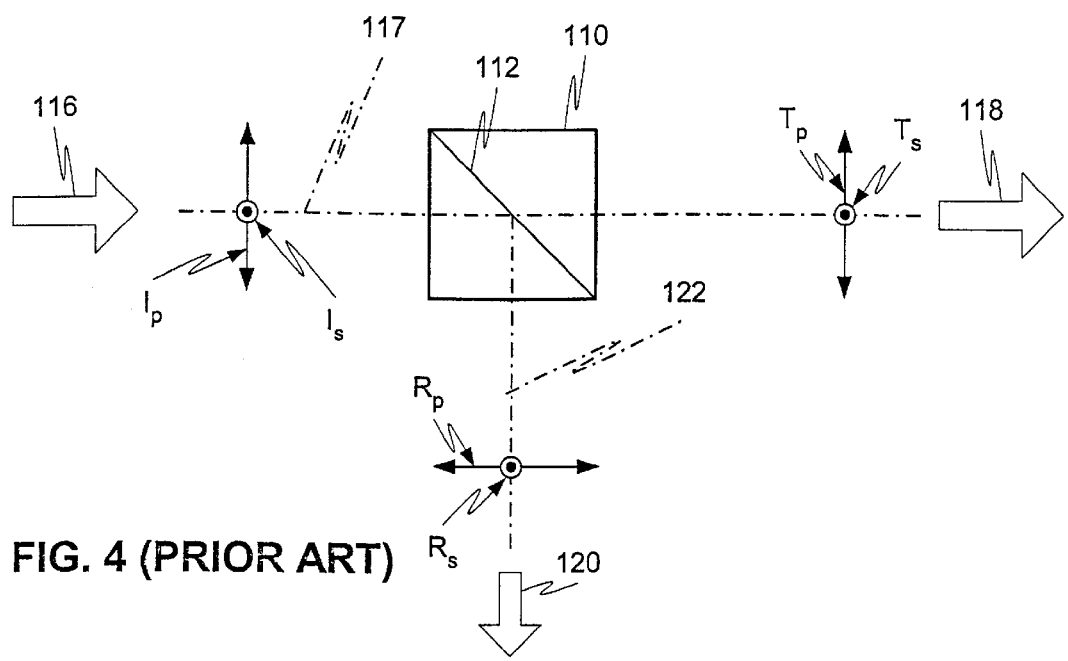
FIG. 4 is a diagram illustrating how a polarizing beam splitting cube works.
Figure 6:
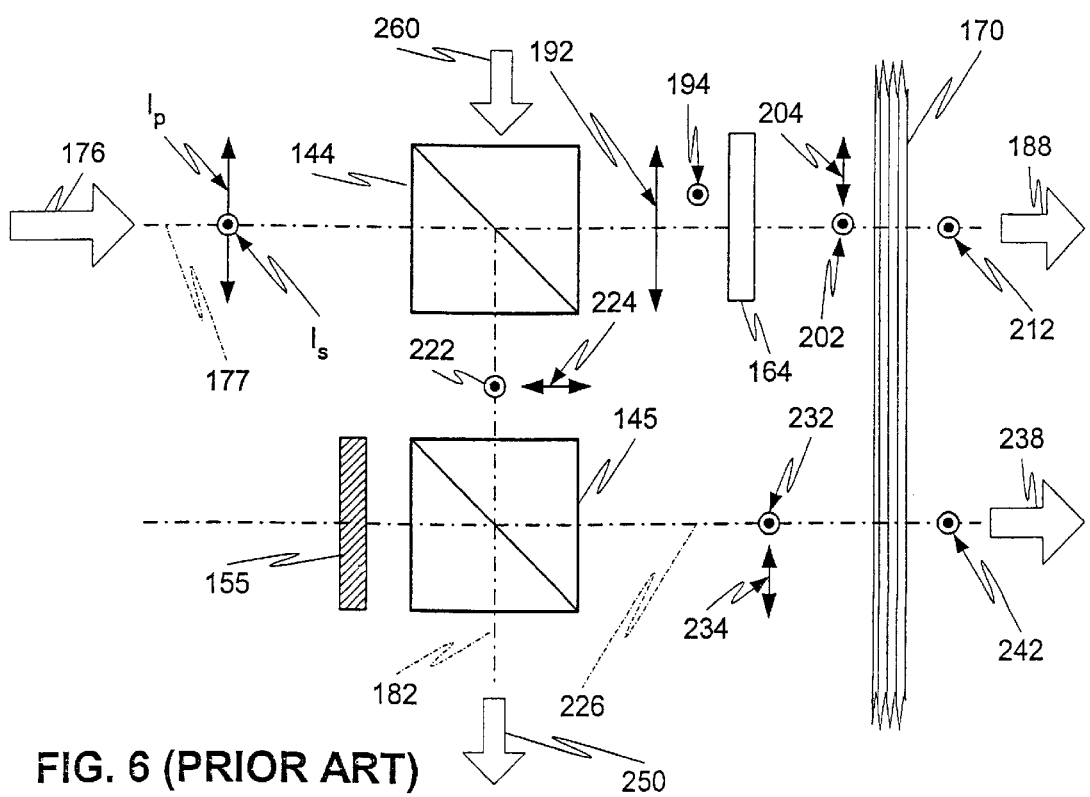
FIG. 6 is a diagram of a unit of the polarizer of FIG. 5.
Figure 5:
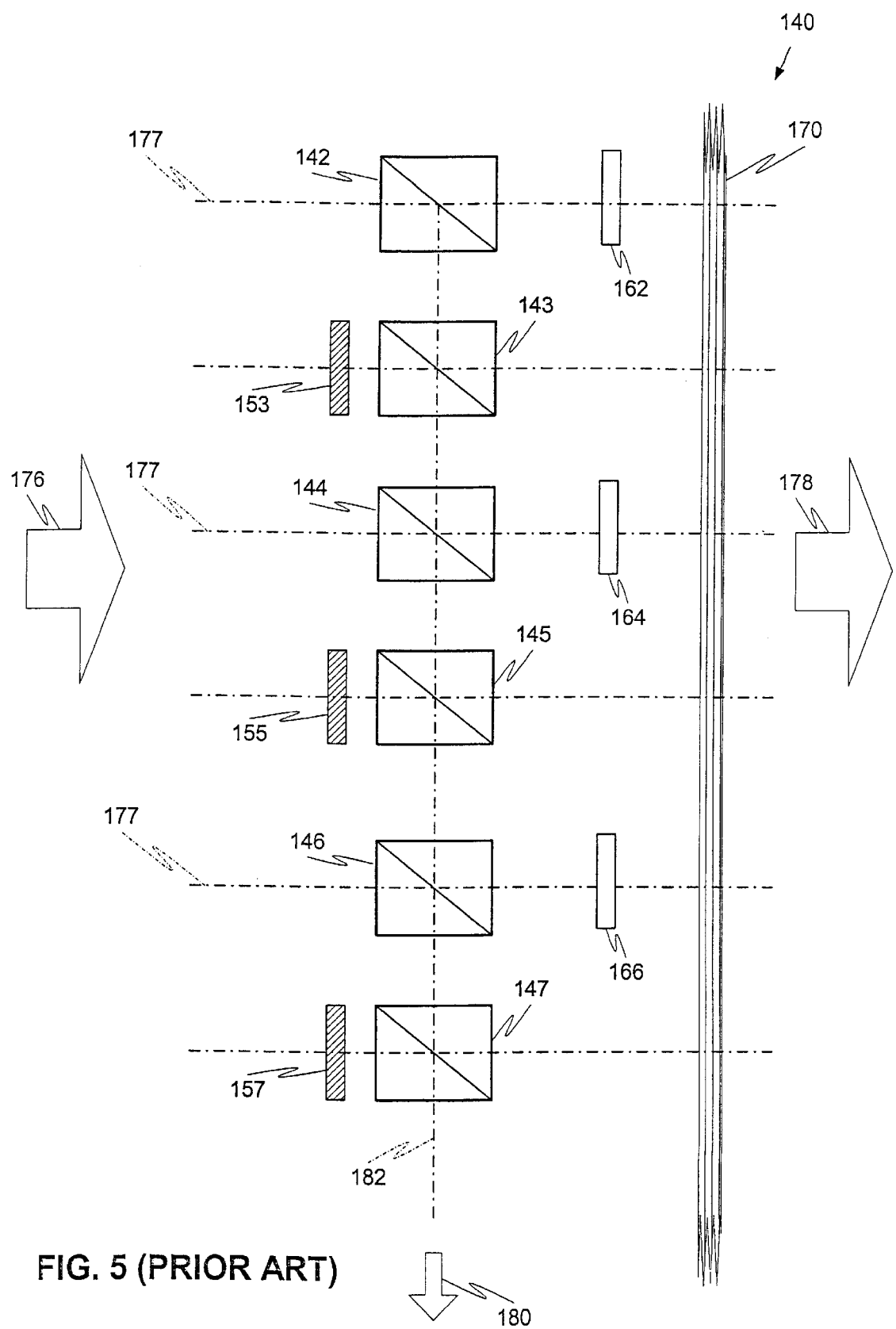
FIG. 5 is a diagram of a prior polarizer.

The polarizer 300 of FIG. 7 provides superior light throughput than the prior art embodiment of FIG. 6. Indeed, in the embodiment of FIG. 6, the percentage of throughput light H(6), for the example of light discussed above, is given by Equation (1) below, where it is assumed that polarizing filter 170 has a throughput efficiency of 0.8.

$$H(6)=0.8*[(T_P*50\%+T_S*50\%)+(R_P*50\%+R_S*50\%)]=0.766 \quad (1)$$

The invention recognizes that filtering out of the S polarized light is high enough by the hypotenuse surface 314 alone of the first PBS cube 302. In fact it is high enough, that it is preferred to not filter it any more. Light exiting through the second cube, however, still needs to be filtered. Accordingly, the invention provides for a polarizing filter that only covers the second cube, but not the first cube. As such, the percentage of throughput light H(7) according to the invention is given by Equation (2) below:

$$H(7)=[T_P*50\%+T_S*50\%]+0.8*[R_P*50\%+R_S*50\%]=0.8605 \quad (2)$$

Accordingly there is an increase in throughput given by Equation (3) below:

$$\frac{H(7)-H(6)}{H(6)}=12.3\% \quad (3)$$

The polarizer 300 will generate a beam 380 along the reflection direction 338, that will not be reflected by the hypotenuse surface 366. This is not important in the first embodiment. If it becomes important, such as it will in the second embodiment, the polarizer 300 preferably also includes an attenuating layer 384, which attenuates beam 380. Preferably the attenuating layer 384 is made by a completely opaque shield, such as a stop.

Figure 8:
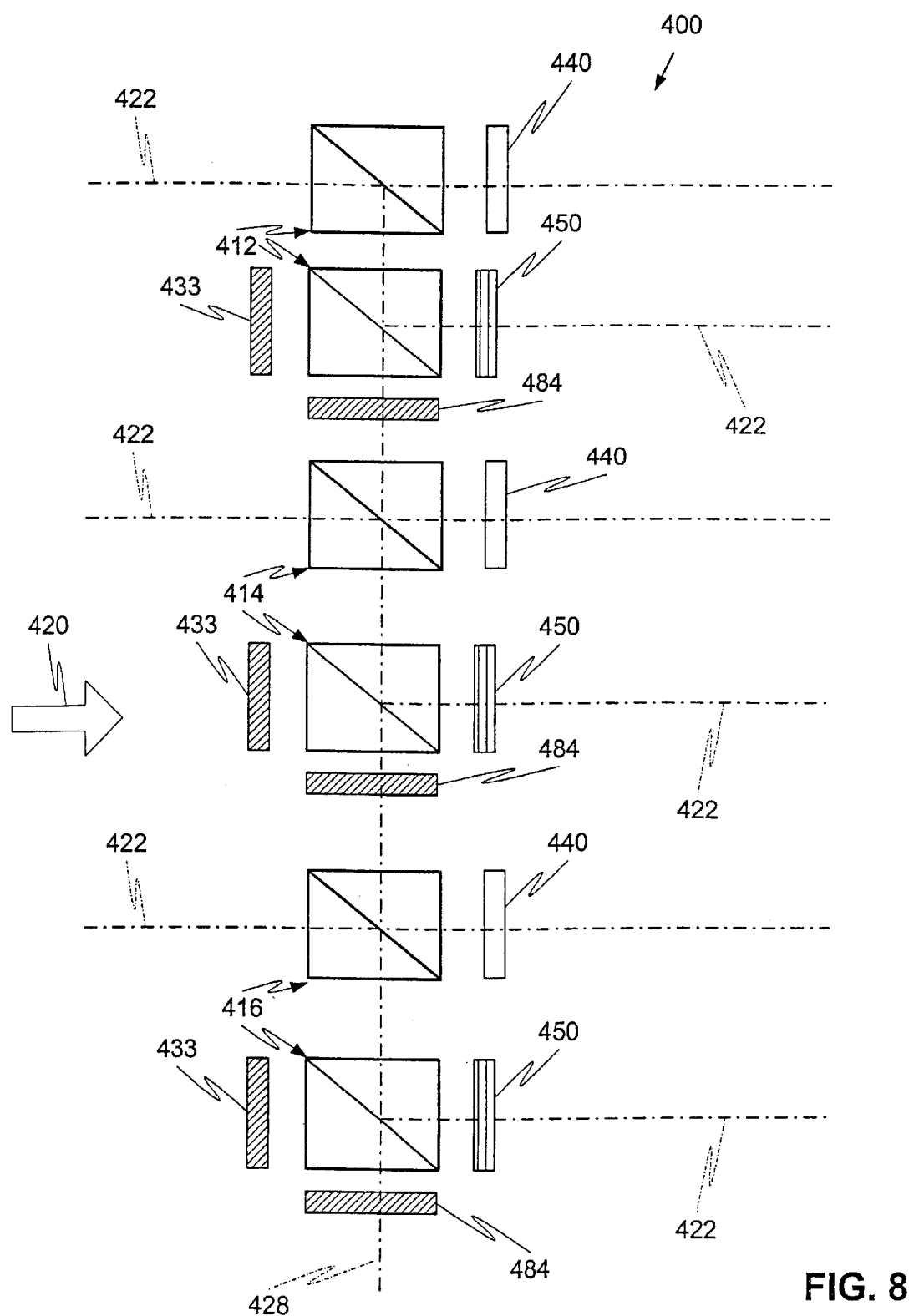
FIG. 8 is a diagram of a composite polarizer made according to a second embodiment of the present invention.

Referring to FIG. 8, a second embodiment 400 of the polarizer of the invention is now described. The polarizer 400 comprises a plurality of pairs 412, 414, 416 of polarizing beam splitting (PBS) cubes. Each pair includes a main PBS cube (top of the pair), and an auxiliary PBS cube (bottom of the pair). The person skilled in the art will recognize that polarizer 400 is an aggregation of three of the polarizers 300 described with reference to FIG. 7. Only three such polarizers are shown, but that is for simplicity only.

In each pair, the main PBS cube receives an incident light beam 420 along an incident direction 422. The main PBS cube transmits a portion of the incident light along the incident direction 422. The main PBS cube further reflects a portion of the incident light along a reflection direction 428. The auxiliary PBS cube receives the light traveling along the reflection direction 428, and reflects it. It reflects it preferably along the incident direction 422, although that is not necessary. It should be noted that the PBS cubes are preferably aligned such that the reflection direction 428 spans all of them.

At least one auxiliary PBS cube is covered by a stop 433, which prevents the light beam 420 from entering the auxiliary PBS cube from the incident direction 422. The stop is preferably totally opaque, although that is not necessary. Further, stops are provided for all front faces of the auxiliary PBS cubes, although that is not necessary, either.

The polarizer 400 further includes at least one retarder 440. The retarder 440 is for changing a polarization of the light exiting along the incident direction 422 from at least one of the main PBS cubes. It is preferable that a retarder 440 is provided for each one of the main PBS cubes.

The polarizer 400 additionally includes at least one polarizing filter 450. The polarizing filter 450 is for filtering at least a portion of the light reflected by at least one of the auxiliary PBS cubes. Importantly, the polarizing filter 450 does not filter at least a portion of the light exiting through the retarder 440, or through the main PBS cube. Preferably the polarizer 400 includes one polarizing filter 450 for each auxiliary PBS cube.

The polarizer 400 preferably further includes a stop 484. The stop 484 is for preventing light exiting from an auxiliary PBS cube along the reflection direction 428 of a first pair 412, from entering a main PBS cube of a second pair 414, or of a third pair 416.

Preferably one stop 484 is included between each pair. The stops thus prevent light from being reflected from the hypotenuse surfaces of the main PBS cubes, and thus from exiting through the retarders 440, without further filtering. As such, where the stops 484 are included in the embodiment of FIG. 8, the reflection direction 428 should not be construed as a continuing light path. In fact, such light path is interrupted by every stop 484, and restarts from the hypotenuse of the main PBS cube of the next pair.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. For example, a polarizer according to the invention can be made from a linear array of PBS cubes, or a surface array from many linear arrays. Additionally, the hypotenuse surfaces need to be parallel to each other, but only for those cubes of a single pair.

A person skilled in the art will be able to practice the present invention in view of the present description, where numerous details have been set forth in order to provide a more thorough understanding of the invention. In other instances, well-known features have not been described in detail in order not to obscure unnecessarily the invention.

Applicant regards the subject matter of the invention to include all combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related application for patent.

The invention claimed is:

1. A light polarizer comprising:
    a first polarizing beam splitting (PBS) cube having a front surface, a rear surface, a side surface, and a hypotenuse surface between the front surface and the rear surface for receiving incident light through the front surface, the hypotenuse surface for transmitting at least a portion of the received light through the rear surface, the hypotenuse surface further for reflecting at least a portion of the received light to travel along a reflection direction through the side surface;
    a retarder for changing a polarization of the light exiting through the rear surface of the PBS cube;
    a reflector for reflecting the light exiting through the side surface along the reflection direction of the PBS cube; and
    a polarizing filter for filtering at least a portion of the light reflected by the reflector, while not filtering at least a portion of the light having a changed polarization due to the retarder.

2. The light polarizer of claim 1, wherein the reflector is a second PBS cube having a hypotenuse surface for receiving and reflecting the light traveling in the reflection direction.

3. The light polarizer of claim 2, further comprising an attenuating layer for attenuating light received and transmitted by the hypotenuse surface of the second PBS cube along the reflection direction.

4. A light polarizer comprising:
    a plurality of pairs of polarizing beam splitting (PBS) cubes, each pair comprising a main PBS cube and an auxiliary PBS cube, the main PBS cube for receiving incident light along an incident direction and for transmitting a portion of the incident light along the incident direction, the main PBS cube further reflecting a portion of the incident light along a reflection direction, the auxiliary PBS cube receiving the light traveling along the reflection direction and reflecting it;
    at least one stop for preventing the incident light from reaching at least a portion of at least one of the auxiliary cubes along the incident direction;
    at least one retarder for changing a polarization of the light exiting along the incident direction from at least one of the main PBS cubes; and
    a polarizing filter for filtering at least a portion of the light reflected by at least one of the auxiliary PBS cubes, while not filtering at least a portion of the light exiting through the retarder.

5. The polarizer of claim 4, wherein the auxiliary PBS cube reflects the light along the incident direction.

6. The polarizer of claim 4, further comprising a stop for preventing light exiting from an auxiliary PBS cube along the reflection direction of a first pair, from entering a main PBS cube of a second pair.

7. The polarizer of claim 6, wherein the auxiliary PBS cube reflects the light along the incident direction.

\* \* \* \* \*